United States Patent [19]

Shinsen

[11] Patent Number: 5,564,774
[45] Date of Patent: Oct. 15, 1996

[54] OPERATION ROOM OF CONSTRUCTION MACHINE

[75] Inventor: Mitsuhisa Shinsen, Ishikawa, Japan

[73] Assignee: Kabushiki Kaisha Komatsu Seisakusho, Japan

[21] Appl. No.: 580,788

[22] Filed: Dec. 29, 1995

Related U.S. Application Data

[63] Continuation of Ser. No. 232,145, filed as PCT/JP92/01133, Sep. 4, 1992, published as WO94/05865, Mar. 17, 1994, abandoned.

[51] Int. Cl.⁶ .................................. B60J 5/06; E02F 9/16
[52] U.S. Cl. ........................ 296/190; 49/41; 180/89.12; 296/146.1
[58] Field of Search ........................... 180/89.12, 89.13; 296/190, 155, 146.1, 202; 49/40, 41

[56] References Cited

U.S. PATENT DOCUMENTS

| | | | |
|---|---|---|---|
| 1,919,387 | 7/1933 | Stringer | 296/155 |
| 3,964,779 | 6/1976 | Benson | 296/190 X |
| 3,982,601 | 9/1976 | Williams | 296/155 X |
| 4,157,846 | 6/1979 | Whitcroft | 296/155 |
| 4,582,357 | 4/1986 | Nakamura et al. | 296/155 X |
| 4,869,544 | 9/1989 | Anwyll et al. | 296/155 |

FOREIGN PATENT DOCUMENTS

| | | | |
|---|---|---|---|
| 858929 | 12/1952 | Germany | 296/155 |
| 0013818 | 1/1988 | Japan | 296/155 |
| 1-198929 | 8/1989 | Japan . | |
| 1-230819 | 9/1989 | Japan . | |
| 0070835 | 3/1990 | Japan | 296/190 |
| 2-69520 | 5/1990 | Japan . | |
| 2-69519 | 5/1990 | Japan . | |
| 3-244781 | 10/1991 | Japan . | |

*Primary Examiner*—Dean Kramer
*Assistant Examiner*—Kia M. Robinson
*Attorney, Agent, or Firm*—Cushman Darby & Cushman, LLP

[57] ABSTRACT

The present invention provides a spacious operation cabin of a construction machine which has a large opening for a door, and which prevents the door from jutting out of the turning radius of the cabin when the door is opened. The outer side (2a) of the operation cabin (2) opposite to a working equipment boom installed on a turntable (1) is formed into an outwardly curved arc including the door (3), and the door (3) is adapted to be freely slidable with rails and rollers which are appropriately positioned. The position of the door (3) when it is opened is controlled to be within the turning radius (R) of the turntable.

7 Claims, 4 Drawing Sheets

5,564,774

OPERATION ROOM OF CONSTRUCTION MACHINE

This is a continuation of application Ser. No. 08/232,145, filed as PCT/JP92/01133, Sep. 4, 1992, published as WO94/ 05865, Mar. 17, 1994, now abandoned.

BACKGROUND OF THE INVENTION

1. Field of the Invention

The present invention relates to an operation cabin of a construction machine, more specifically, an operation cabin of a construction machine such as a power shovel which has a turntable.

2. Related Background Art

A hydraulic power shovel has a turntable 22 on a crawler 21 as shown, for example, in FIG. 6 (PRIOR ART) and is provided with an operation cabin 23, an engine room 24 and a collapsible working machine 25. The operation cabin 23 installed on such a vehicle is located off the center of the turntable 22 as shown, for example, in FIGS. 7 (PRIOR ART) and 8 (PRIOR ART), and a door 26 of this operation cabin 23 for accessing of an operator is adapted to be opened by turning it in the direction of arrow A as shown in FIG. 7 in case of a hinged type door and by sliding it up to a position shown with a two-dotted broken line as shown in FIG. 8 in case of a slide type door. However, there has been a problem that, if the hinged type door is provided with a large-sized opening, the door comes out of the turning radius R of the upper turning body when the door is opened and fixed and may be damaged by an external obstacle during work, and, in the case of the slide type door, rails and rollers to be used for sliding the door protrude into the operation cabin whereby the internal space of the operation cabin is reduced.

SUMMARY OF THE INVENTION

An object of the present invention made in view of the above-described problem is to prevent deviation of the door from its turning radius when the door is opened while preserving the large size of the door opening, and providing an operation cabin of a vehicle having an upper turning body which is capable of providing a large indoor space, thereby eliminating defects of the related background art.

Therefore, the present invention specifies forming the side of the operation cabin, including the door, at the opposite side to the boom of a working equipment installed on the turntable into an outwardly curved arc, provide rails at this side of the operation cabin and rollers, which are always engaged with these rails, to allow the door to be freely openable and limit the opening position of the door within the turning radius of the turntable along the outer side of the operation cabin.

The rollers provided on the door are engaged with the rails provided at the side of the operation room and therefore the door can be opened or closed along with movement of the rollers in the rails. When the door is opened, the door stays within the turning radius of the turntable and can avoid collision with an external obstacle even when the turntable is turned around.

DESCRIPTION OF THE PREFERRED EMBODIMENTS

Figure 1:
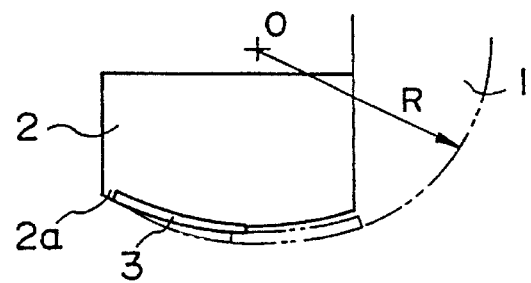
FIG. 1 is a plan view of an embodiment of the operation cabin of a construction machine according to the present invention.

The present invention is described referring to the embodiments shown in FIGS. 1 to 5. The lateral side 2a of the operation cabin 2 which is located at the opposite side of the boom of the working equipment installed on the turntable 1 shown in the drawings is formed into an outwardly curved arc including the door. An upper rail 4 is installed on the upper part of the inner lateral side 2a of the operation cabin. A lower rail 5 is installed on the lower part of the interior of lateral side 2a and a center rail 6 is installed at the center of the exterior of side 2a. A upper roller member 7, a lower roller member 8 and a center roller member 9, which are always engaged with the rails to make the door 3 freely slidable, are provided on the door 3. Thereby, the opening position of the door 3 is limited within the turning radius R of the turntable 1 along the outer side of the operation cabin 2.

The exterior of side 2a of the operation cabin is formed with a tall opening 2b which has a larger width than a conventional opening (the height is as same as conventional) because the front half of the side 2a uses an arc profile to install the door 3 and the rear half is formed as a side wall 2c. An upper rail 4 of a specified length which has a groove type section and is curved in the longitudinal direction is horizontally provided at an upper center of the inner side of the operation cabin 2 near the ceiling of the side 2a and a similar lower rail 5 is provided at a lower part of the inner side so that it is positioned forward of the upper rail 4. A horizontal, groove type center rail 6 is provided at the center of the side wall 2c. The door 3 is larger than the opening 2b. At the middle of its inside, upper edge, the door 3 is provided with an upper roller member 7 which has a roller 7a at its extreme end for engaging with the groove of the upper rail 4. At the front end of its inside lower edge, the door 3 is provided with a lower roller member 8 which has a roller 8a for engaging with the groove of the lower rail 5. In addition, a center roller member 9 which has a roller 9a for engaging with the groove of the center rail 6 is provided at the rear end of the center of the inside of door 3. Accordingly, the door 3 is installed on the operation cabin by the engagement of rollers 7a, 8a and 9a with rails 4, 5 and 6 as shown with a two-dotted broken line in FIG. 2.

Figure 2:
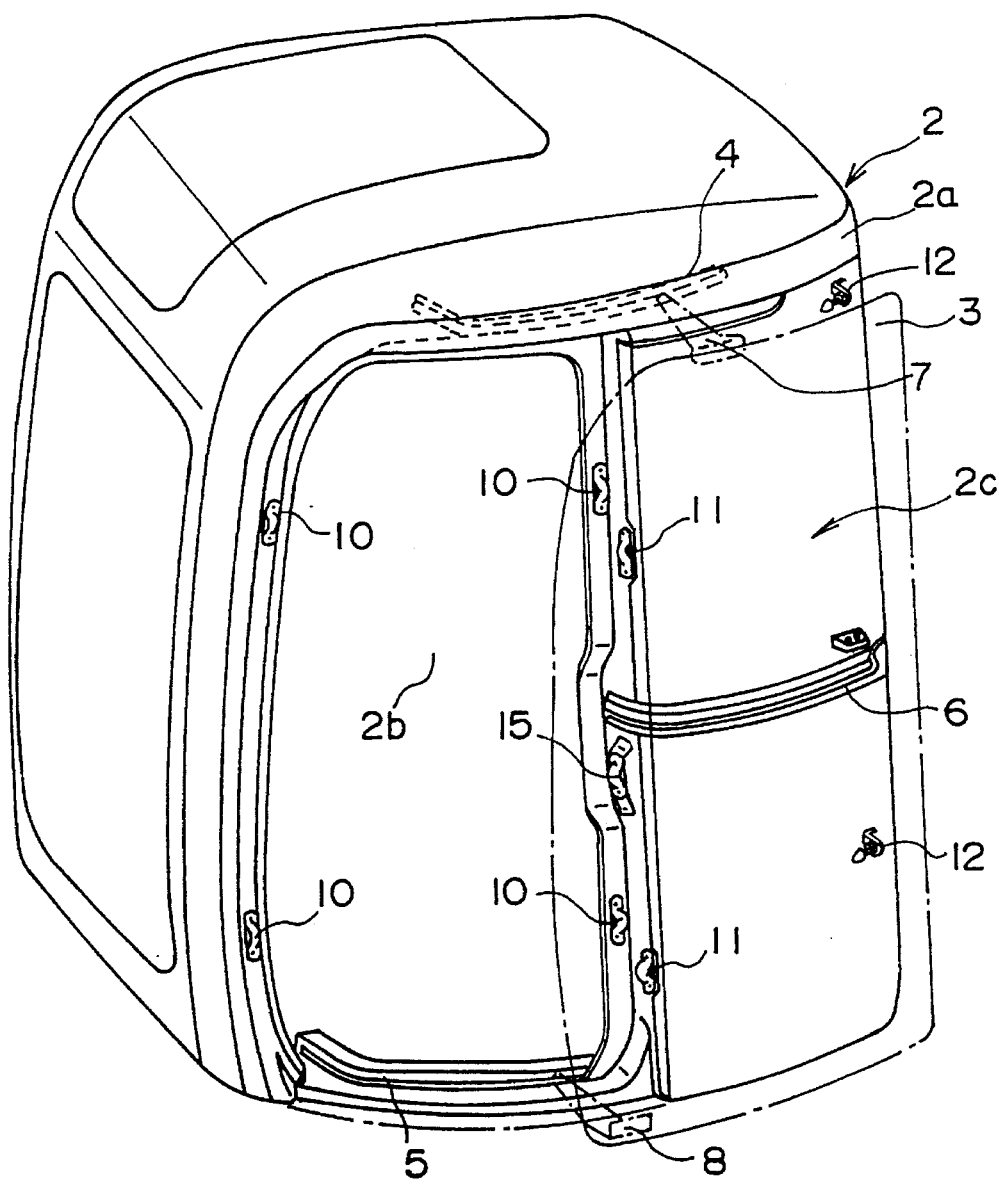
FIG. 2 is a perspective view of the operation cabin shown in FIG. 2.
Figure 3:
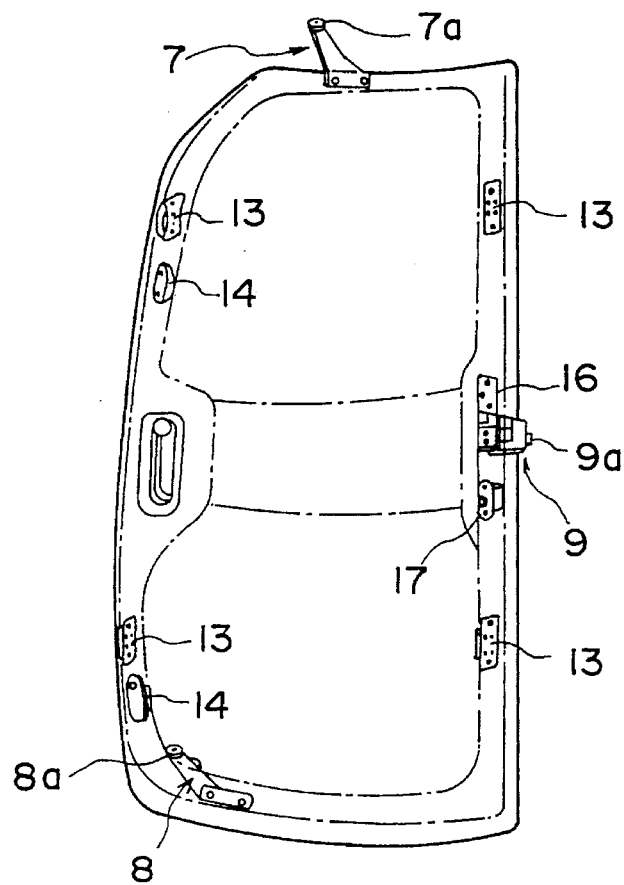
FIG. 3 is a perspective view of a door shown in FIG. 1.
Figure 5:
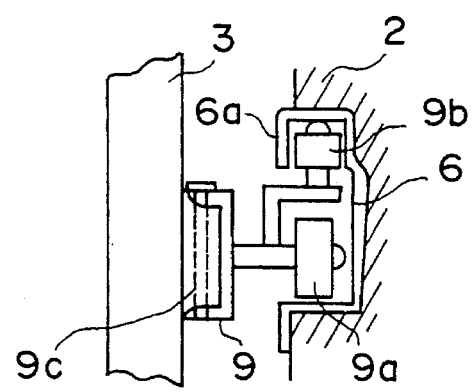
FIG. 5 is a cross-sectional illustration of a center rail and a center roller, showing engagement of the operation cabin and the door according to the present invention.
Figure 4:
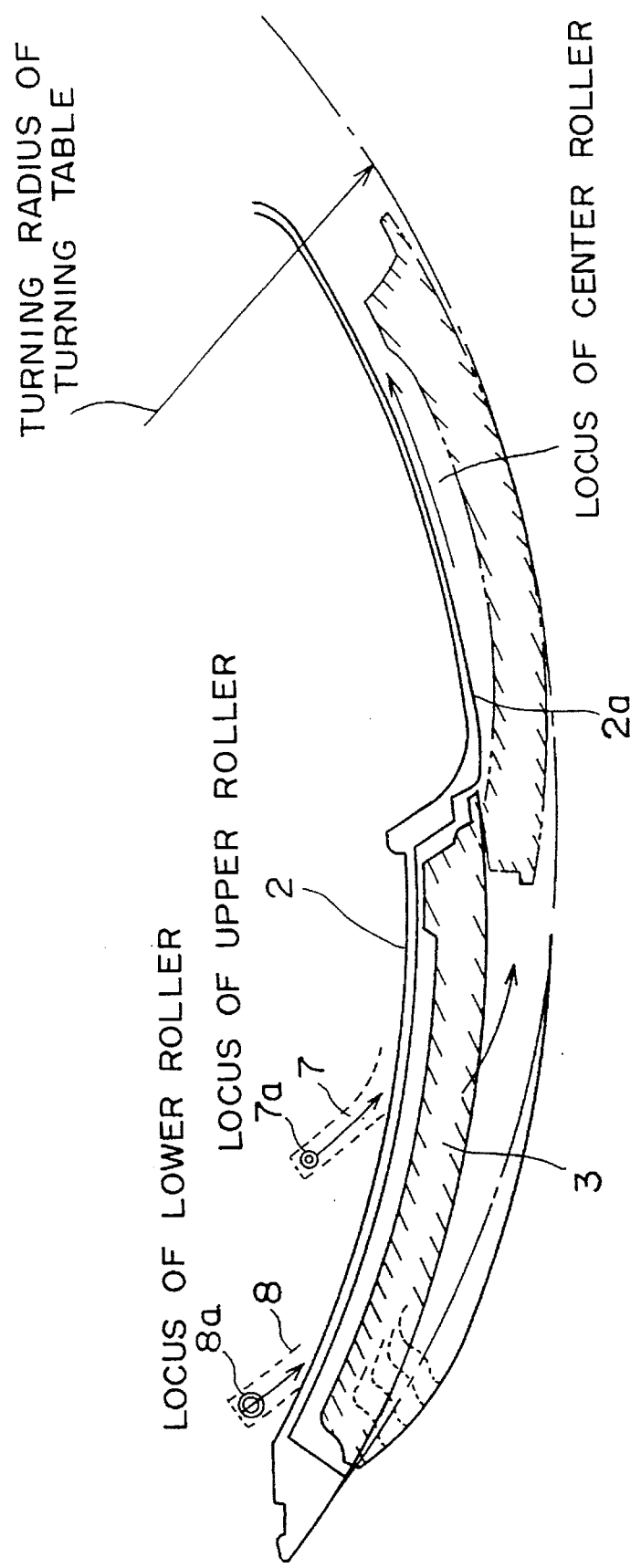
FIG. 4 is a cross-sectional illustration of a locus in a plane or path travelled when the door installed at the operation cabin shown in FIG. 2 is moved from closing to opening.
Figure 6:
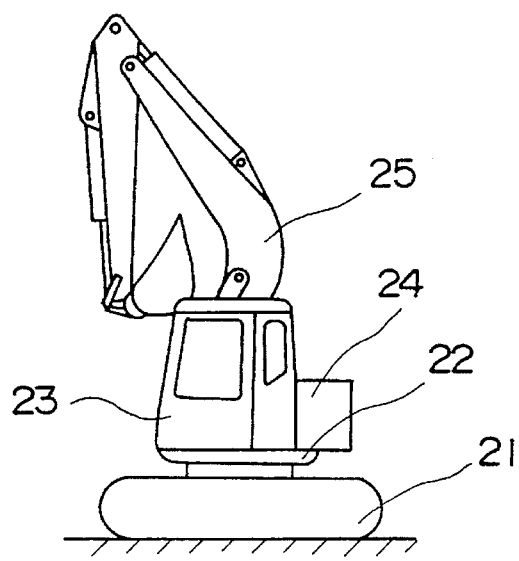
FIG. 6 is an illustration showing a side view of a hydraulic power shovel according to the related background art.
Figure 7:
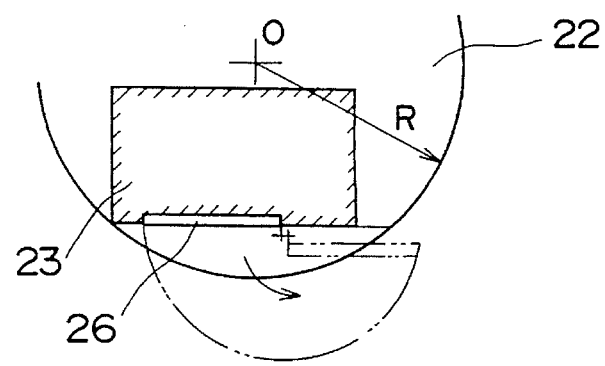
FIG. 7 is a schematic, cross-sectional illustration showing one problem of the operation cabin according to the related background art.
Figure 8:
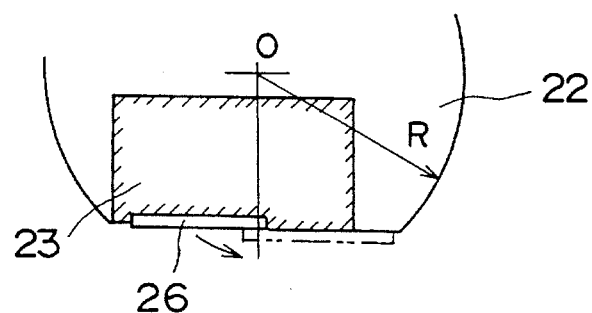
FIG. 8 is a schematic, cross-sectional illustration showing another problem of the operation cabin according to the related background art.

Operation is described below. The door 3 of the operation cabin 2 is opened and closed along a locus or path as shown in FIG. 2. Specifically, for closing the door 3, the front edge of the door 3 is gradually aligned with the exterior of side 2a of the operation cabin 2 while moving the door 3 in parallel with the side 2a. Accordingly, when the door 3 is opened, the full face of the door 3 is overlapped with the arc surface of the exterior of side 2a of the operation cabin 2 and the door 3 is held within the turning radius R as shown. This movement of the door 3 is carried out while being controlled in the horizontal direction when the upper roller member 7 is engaged with the upper rail 4, the center roller member 9 is engaged with the center rail 6 and the lower roller member 8 is engaged with the lower rail 5. Numerals 10 to 15 in FIGS. 2 and 3 are, respectively, external or internal strikers for fixing the door 3 at that position and preventing horizontal movement of the door 3 when the door 3 is closed or opened. The details of the mechanical engagement of the rails and rollers can be explained referring to an example of the engagement of the center rail 6 and the center roller member 9 as shown in FIG. 5. The center rail 6 has a guide 6a and the center roller member 9 has a roller 9a and a roller 9b to allow the roller 9a to receive a load during movement of the door 3, and the roller 9b is engaged with the guide 6a to prevent the door 3 from coming off from the operation cabin 2. The center roller member 9 rotates around the shaft 9c as a pivot to ensure smooth sliding of the door 3.

The operation cabin of a construction machine according to the present invention is useful as an operation cabin for construction machines, particularly, excavating machines having a turntable, such as power shovels.

What is claimed is:

1. A construction machine comprising:
   a turntable having a turning radius;
   a boom connected to rotate with the turntable; and
   an operation cabin located adjacent the boom and off-center on the turntable and connected to rotate with the turntable;
   wherein the operation cabin comprises a front, a rear, an outwardly-curved, arc-shaped side opposite the boom, an operator opening in the side, and an outwardly-curved, arc-shaped door connected to the side so as to move slidably along a predetermined path to open and close the opening; and
   wherein the path is defined so that the door moves along the outside of the arc-shaped side, but does not project outside of the turning radius when opened.

2. A machine according to claim 1, further comprising a plurality of rails connected to said cabin for defining said path and a plurality of rollers connected to said door for slidably guiding said door along said path.

3. A machine according to claim 2, further comprising a central rail formed in said side, and a central roller member connected to said door for slidably engaging the central rail.

4. A machine according to claim 3, wherein said central roller member comprises a first roller for preventing said door from becoming disengaged from said central rail, a second roller for bearing the load of said door, and a shaft for allowing the central roller member to pivot around an axis to ensure smooth sliding of the door.

5. A machine according to claim 4, wherein said axis is substantially perpendicular to said central rail.

6. A machine according to claim 4, wherein said first and second rollers rotate around respective axes substantially perpendicular to one another.

7. A construction machine according to claim 1, wherein a plurality of strikers are provided between the door and the cabin so as to fix the door when it is closed or opened.

* * * * *